I. E. PALMER.
RUNNING GEAR FOR VEHICLES.
APPLICATION FILED AUG. 12, 1908.

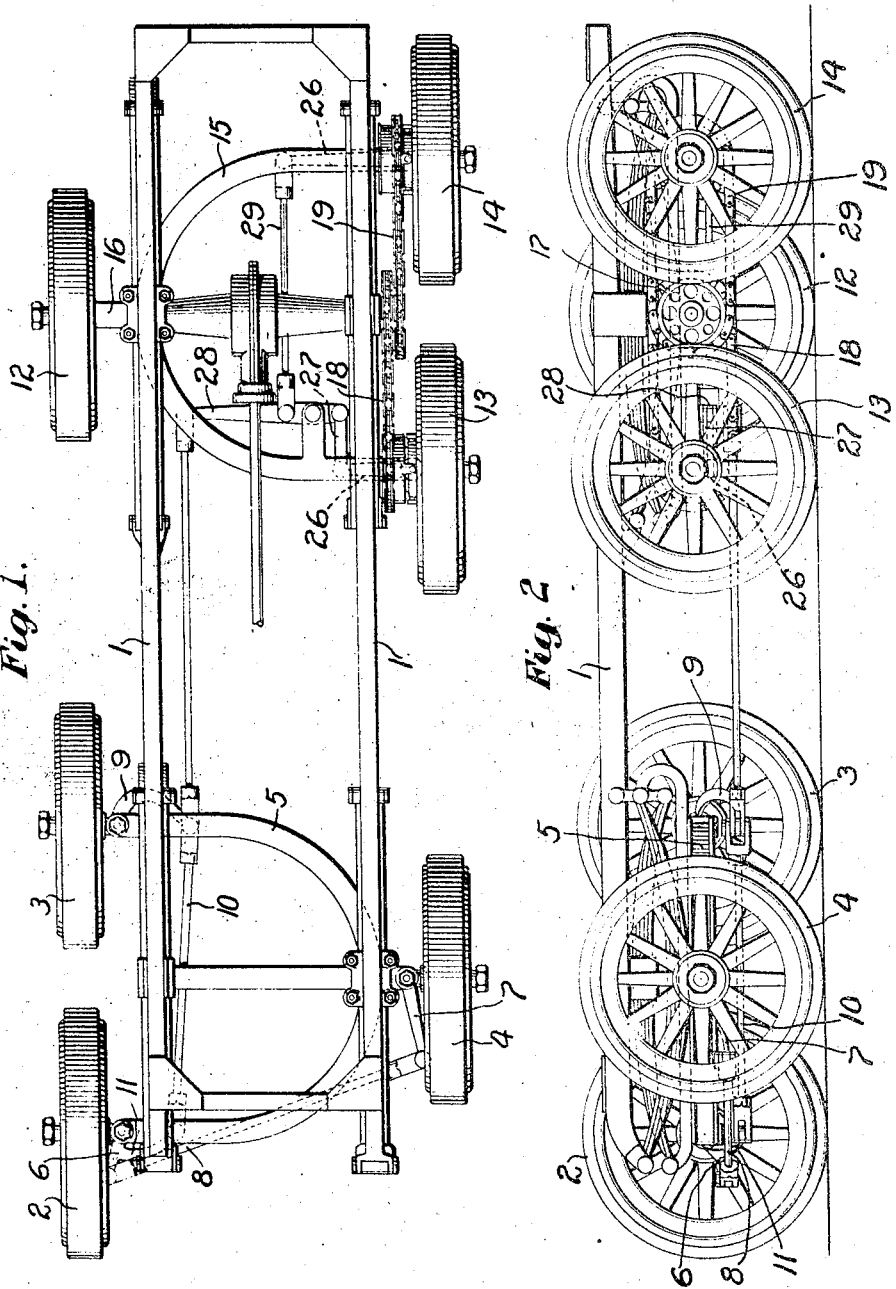

938,784.

Patented Nov. 2, 1909.
2 SHEETS—SHEET 2.

Witnesses:
Edwin T. Luci
Robert H. Kammler

Inventor:
Isaac E. Palmer
by Emery and Booth Attys

UNITED STATES PATENT OFFICE.

ISAAC E. PALMER, OF MIDDLETOWN, CONNECTICUT.

RUNNING-GEAR FOR VEHICLES.

938,784. Specification of Letters Patent. Patented Nov. 2, 1909.

Application filed August 12, 1908. Serial No. 448,129.

*To all whom it may concern:*

Be it known that I, ISAAC E. PALMER, a citizen of the United States, and a resident of Middletown, in the county of Middlesex and State of Connecticut, have invented an Improvement in Running-Gear for Vehicles, of which the following description, in connection with the accompanying drawings, is a specification, like numerals on the drawings representing like parts.

This invention relates to trackless, power-driven vehicles, and it has more particularly for its objects to provide a construction whereby, if desired, the use of pneumatic tires may be avoided, to provide increased traction, to provide more extensive wheel support so as to reduce the weight upon particular wheels, and, to provide improved wheel-deflecting mechanism.

In order that the principles of the invention may be clearly understood, I have in the accompanying drawings disclosed certain types or embodiments thereof wherein,—

Figure 3:
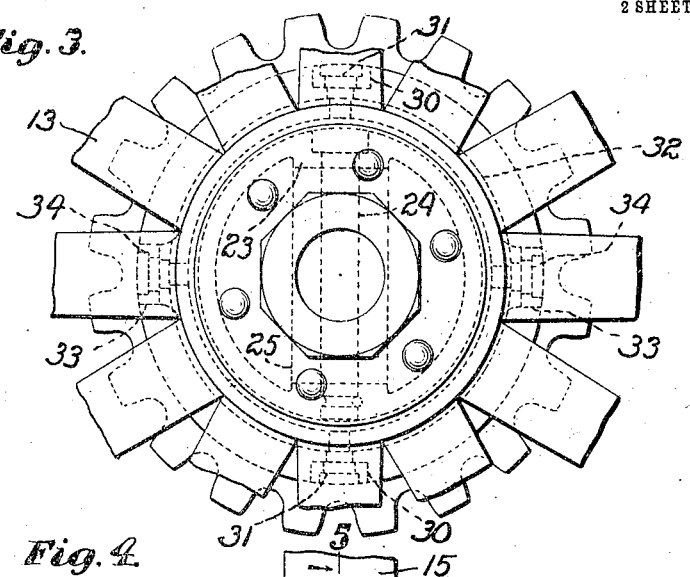
Figure 4:
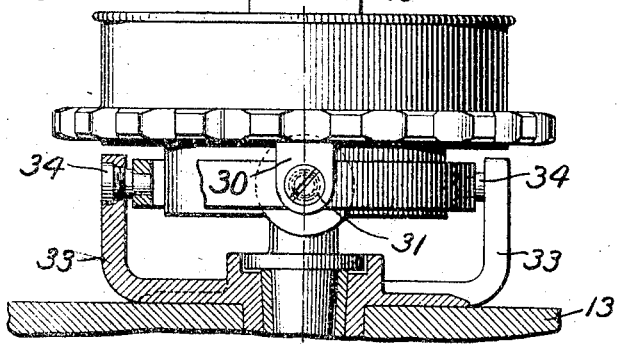
Figure 5:
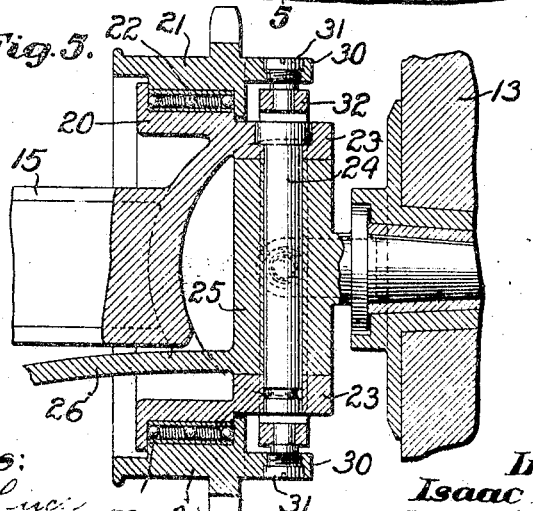

Figure 1 is a plan view of a portion of the body and the running gear of a trackless, power-driven vehicle embodying one form of my invention; Fig. 2 is a side elevation of the construction shown in Fig. 1; Fig. 3 is a side elevation, upon an enlarged scale, of a portion of the wheel deflecting mechanism; Fig. 4 is a plan view of the construction shown in Fig. 3; and Fig. 5 is a central section upon the line 5—5 of Fig. 4.

Referring more particularly to the drawings, the body frame of the vehicle is represented at 1 in Figs. 1 and 2, it being of any suitable construction.

In the present form of the invention I have represented three front wheels, 2, 3 and 4, respectively; each of said wheels being mounted for lateral deflection or guiding movement. In connection with three rear wheels, I may employ any suitable number of front wheels, as, for example, two front wheels which may be in or out of transverse alinement, as disclosed in my application No. 409,753, filed Jan. 8, 1908. While the front wheels may be mounted in any suitable manner, preferably I provide a yoke-like axle 5, upon the ends whereof the wheels 2 and 3 are mounted for rotative and deflective movement. The wheel 4 is mounted at the opposite side of the vehicle, and, if desired, upon the yoke-like axle 5 for rotative and deflective movement. Preferably the wheel 4 is out of transverse alinement with both wheels 2 and 3. The front wheels are connected to the steering mechanism for simultaneous deflective movement. To accomplish this result I have herein represented a lever 6, secured to the spindle of the wheel 2, and a longer lever 7, secured to the spindle of the wheel 4, said levers having jointed thereto a connecting rod 8, suitably connected to the steering mechanism (not shown). The levers 6 and 7 are so proportioned as to impart to the leading wheel 2 a greater angular deflection than is imparted to the wheel 4. The wheel 3 has secured to the spindle thereof a lever 9, jointed for simultaneous deflective movement with the levers 6 and 7 in any suitable manner, as by means of a connecting rod 10, herein represented as pivoted at its front end to a side extension 11 from the lever 6.

I have herein represented three rear wheels, 12, 13 and 14, respectively, the wheels 13 and 14 being mounted upon the ends of a yoke-like axle 15. The wheel 12 is mounted upon a shaft 16, driven in any suitable manner. Preferably the wheel 12 is mounted for non-deflective movement upon the shaft 16 and when the vehicle is turned acts as the pivot wheel. One or both of the wheels 13, 14 may be driven in any suitable manner from the shaft 16, a gear or sprocket drive being preferred. Herein I have represented a double sprocket wheel 17, mounted upon the shaft 16 and having sprocket chains 18 and 19, leading respectively to suitable sprocket wheels operatively connected to the wheels 13 and 14. The wheels 13 and 14 may be mounted in any suitable manner for lateral deflective movement. The single wheels of the front and rear trucks may, if desired, be proportionately heavier and stronger, and if desired broader than the wheels opposite thereto.

Referring more particularly to Figs. 4 and 5, I have there represented a portion of a wheel, which in the present instance may be either wheel 13 or 14. The axle 15 is laterally extended at its end to provide a bearing ring 20, whereon is suitably mounted sprocket gear 21, ball bearings 22 being provided if desired. Herein, fast in extensions 23, 23 from the axle 15, is mounted a preferably vertical pintle 24, surrounding which is a sleeve 25 from which extends an arm 26 suitably connected to the steering mechanism. Referring to Fig. 1, the arms 26, extending from the sleeves 25 pertaining to the wheels 13 and 14, are connected in any suitable manner with the steering mechanism for the front wheels, but preferably so that the wheels 13, 14 are deflected in opposite directions. Herein the arm 26, pertaining to the wheel 13, is jointed by connecting rod 27 to a lever 28, suitably pivoted upon the axle 15 and jointed to the connecting rod 10. The arm 26, pertaining to the wheel 14, is herein represented as jointed to a connecting rod 29, the opposite end whereof is pivoted to the lever 28. When steering movement is imparted to the connecting rod 10 upon lateral deflection of the wheels 2, 3 and 4, the wheels 2 and 3 are positively deflected in opposite directions through the described connections.

The gear wheel 21, Figs. 4 and 5, is provided with opposite ears 30 in alinement with the pintle 24. Fast in said ears are screws 31, 31, the inner ends thereof serving as journals for a ring 32, which may thus rock upon an axis coincident with the pintle 24. The wheel 13 is connected to the ring 32 in such manner as to be driven therefrom at any angle of deflection. Herein for the purpose the spindle of the wheel 13 is provided with a yoke 33, wherein are mounted opposite screws 34, 34, entering opposite holes in the ring 32. The screws 34, 34 are positioned intermediate the screws 31, 31, and are shown as at right angles thereto. When the arm 26 is rocked in either direction the sleeve 25 is correspondingly oscillated about the pintle 24, thereby deflecting the wheel 13 upon the pintle 24 and the screws 31, 31 as a vertical axis, toward and from the longitudinal axis of the vehicle.

The single truck having the three wheels 12, 13 and 14 and arranged as described and claimed, with two laterally deflectable wheels on one side and power means to drive one or both of said laterally deflectable wheels, is of general application, may be applied to any suitable body frame of a trackless, power driven vehicle, and be connected thereto at any suitable part thereof, with or without another truck.

Having thus described one type or embodiment of my invention, I desire it to be understood that although specific terms are employed they are used in a generic and descriptive sense and not for purposes of limitation, the scope of the invention being set forth in the following claims.

Claims.

1. Running gear for trackless, power driven vehicles comprising in combination, a front truck provided with a yoke-like axle having mounted thereon two laterally deflectable wheels at one side of the vehicle, said truck having one laterally deflectable wheel at the other side thereof.

2. Running gear for trackless, power driven vehicles comprising in combination, a front truck having three wheels only, arranged in staggered relations, two on one side and one on the opposite side, a three wheel rear truck having two wheels on one side and one on the other, said two wheels being laterally deflectable in opposite directions, steering mechanism connected to all of said deflectable wheels, whereby they may be simultaneously deflected and means for driving one or more of said laterally deflectable wheels.

3. Running gear for trackless, power driven vehicles comprising in combination, front and rear three wheel trucks, a yoke-like axle on each truck and each supporting two wheels, said yokes being oppositely arranged, one or more wheels of each truck being laterally deflectable, and common steering means for deflecting said wheels relative to the respective trucks.

4. Running gear for trackless, power driven vehicles comprising in combination, front and rear three wheel trucks, a yoke-like axle on each truck and each supporting two wheels, said yokes being oppositely arranged, the third wheel on each truck being mounted adjacent the crown of each yoke, and means for simultaneously deflecting all the wheels of the forward truck and a plurality of wheels of the rear truck.

5. Running gear for trackless, power driven vehicles comprising in combination, a three wheel truck having two wheels on one side and one on the other, and a driving shaft supported by said truck and whereon said odd wheel is mounted, said two wheels being laterally deflectable.

6. Running gear for trackless, power driven vehicles comprising in combination, a three wheel truck having two wheels at one side of the vehicle, means for driving said two wheels and a driving shaft supported by said truck and carrying a non-laterally deflectable third wheel at the opposite side of the vehicle.

7. Running gear for trackless, power driven vehicles comprising in combination, a three wheel truck having two wheels at one side of the vehicle, a driving shaft supported by said truck, a wheel mounted upon said shaft at the opposite side of the vehicle, a gear wheel upon said shaft, and driving connections therefrom to said two wheels.

8. Running gear for trackless, power driven vehicles comprising in combination, a three wheel truck having two wheels at one side of the vehicle, a driving shaft supported by said truck, a wheel mounted on said shaft at the opposite side of the vehicle, a double sprocket gear upon said shaft at the end thereof adjacent said two wheels, and sprocket chains connecting the latter and said gears.

9. Running gear for trackless, power driven vehicles comprising in combination, a three wheel truck having two wheels arranged upon one side and the remaining wheel upon the other, and a plurality of said wheels being deflectable, pivoted rings whereto said deflectable wheels are connected, means for positively deflecting said deflectable wheels and power means connected to said rings for driving said vehicle.

10. Running gear for trackless, power driven vehicles comprising in combination a three wheel truck having a yoke-like axle, a pair of wheels carried thereby at one side of the vehicle, pivoted rings supported by said axle and to which said wheels are connected, means for positively deflecting said pair of wheels, and a driving shaft mounted upon said truck, the third wheel of said truck being mounted on said driving shaft.

11. Running gear for trackless power-driven vehicles comprising, in combination, a truck having three wheels only and arranged in staggered relation one on one side and two on the opposite side of said truck, the said two wheels being laterally deflectable, and power means for driving one or both of said laterally deflectable wheels.

12. Running gear for trackless power-driven vehicles comprising, in combination, a truck having three wheels only, said wheels being arranged in staggered relation one on one side and two on the opposite side of the truck, the said two wheels being laterally deflectable, and power means for driving all three wheels.

13. Running gear for trackless power-driven vehicles, comprising, in combination, a truck having three wheels only, one of said wheels being on one side and two on the opposite side of said truck, rings carried by said truck and connected to a plurality of said wheels, and power driving means connected to said rings, said wheels to which the rings are connected being dirigible.

In testimony whereof, I have signed my name to this specification, in the presence of two subscribing witnesses.

ISAAC E. PALMER.

Witnesses:
 Chas. M. Sauer,
 Reuben M. Burr.